(12) United States Patent
Kynast et al.

(10) Patent No.: US 9,573,257 B2
(45) Date of Patent: Feb. 21, 2017

(54) HANDHELD POWER TOOL, METHOD FOR OPERATING A HANDHELD POWER TOOL

(71) Applicant: Robert Bosch GmbH, Stuttgart (DE)

(72) Inventors: Andreas Kynast, Stuttgart (DE); Guenter Lohr, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/677,504

(22) Filed: Apr. 2, 2015

(65) Prior Publication Data

US 2015/0283685 A1 Oct. 8, 2015

(30) Foreign Application Priority Data

Apr. 2, 2014 (DE) .................. 10 2014 206 271

(51) Int. Cl.
| | |
|---|---|
| *B25B 23/18* | (2006.01) |
| *F21V 33/00* | (2006.01) |
| *H05B 33/08* | (2006.01) |
| *H05B 37/02* | (2006.01) |
| *B25B 21/00* | (2006.01) |
| *F21W 131/30* | (2006.01) |

(52) U.S. Cl.
CPC ............... *B25B 23/18* (2013.01); *B25B 21/00* (2013.01); *F21V 33/0084* (2013.01); *H05B 33/0842* (2013.01); *H05B 33/0854* (2013.01); *H05B 37/0227* (2013.01); *F21W 2131/30* (2013.01)

(58) Field of Classification Search
CPC ...... B25B 21/00; B25B 23/18; F21V 33/0084; F21W 2131/30; F21Y 2101/02; H05B 33/0842; H05B 37/0227; H05B 33/0854
See application file for complete search history.

(56) References Cited

U.S. PATENT DOCUMENTS

| | | | | |
|---|---|---|---|---|
| 2009/0260239 | A1* | 10/2009 | Cerwin | B23B 49/006 33/286 |
| 2014/0007442 | A1* | 1/2014 | Pettersson | B23Q 17/22 33/626 |

* cited by examiner

*Primary Examiner* — Stephen F Husar
(74) *Attorney, Agent, or Firm* — Maginot, Moore & Beck LLP

(57) ABSTRACT

A handheld power tool, in particular an electric handheld power tool, includes an actuable drive device configured to drive a tool and an illumination device. The illumination device is connected to an acceleration sensor and varies its generated light depending on movements of the handheld power tool that are detected by the acceleration sensor.

11 Claims, 2 Drawing Sheets

HANDHELD POWER TOOL, METHOD FOR OPERATING A HANDHELD POWER TOOL

This application claims priority under 35 U.S.C. §119 to patent application no. DE 10 2014 206 271.3, filed on Apr. 2, 2014 in Germany, the disclosure of which is incorporated herein by reference in its entirety.

BACKGROUND

The disclosure relates to a handheld power tool, in particular an electric handheld power tool, comprising an actuable drive device for driving a tool, and comprising an illumination device.

Furthermore, the disclosure relates to a method for operating such a handheld power tool comprising an actuable drive device for driving a tool and an illumination device.

Handheld power tools and methods for operating them are known from the prior art. In this regard, electrically operated handheld screwdrivers are known, for example, at the tip of which a light-emitting diode is provided, which illuminates the tool tip or the workpiece in the region of the tool tip. This is intended to make it easier for the user to correctly position the screw and screw it in. Corresponding apparatuses are also known in the case of drills, for example.

SUMMARY

The handheld power tool according to the disclosure has the advantage that the light generated by the illumination device offers the user more than just illuminating the workpiece. It facilitates orientation and additionally conveys information to the user. The user, who will always observe the workpiece, in particular that location of the workpiece which is to be processed, intuitively takes in the information provided by the illumination device, as a result of which the work with the handheld power tool is simplified and optimized. According to the disclosure, for this purpose it is provided that the illumination device is connected to an acceleration sensor and varies the generated light depending on acceleration values or movements of the handheld power tool which are detected by the acceleration sensor. As a result of the detection of accelerations of the handheld power tool, movements of the handheld power tool are detected in a simple manner. In particular, it is provided that the generated light upon movements being detected differs from the generated light which is emitted if no movements are detected. This signals to the user in a simple manner that the handheld power tool is being held steadily enough to carry out an optimum processing operation. If the user moves the handheld power tool back and forth too much, it is possible, for example by a warning color being set, to make the user aware that at present a processing operation should not yet be carried out by the user.

In accordance with one advantageous development of the disclosure, it is provided that the illumination device comprises means for varying a light cone of the illumination device. The illumination device generates a light cone which is expediently directed onto the workpiece to be processed or onto the tool tip. As a result of the light cone being varied, information for optimizing the processing can be conveyed to the user.

In particular it is provided that the illumination device comprises means for directing the light cone. In this case, for example, depending on an orientation of the handheld power tool, which can be detected for example by means of an electric spirit level or the like, the light cone can provide information if the light cone is directed away from the tip of the tool, in order to symbolize a quasi-eccentric orientation of the tool tip with respect to the light cone.

In accordance with one preferred development of the disclosure, it is provided that the illumination device comprises means for expanding or narrowing the light cone. As a result of the light cone being expanded or narrowed, the generated light can be generated in a concentrated fashion or diffusely. In this regard, it is provided, in particular, that if no or only small accelerations are detected by the acceleration sensor, the light cone is narrowed in order to focus the location to be processed. If the handheld power tool is moved to a great extent, then the light cone is expanded in order to generate a diffuse light distribution, as a result of which the user intuitively grasps that the tool is not yet in optimum processing steadiness.

Preferably, it is provided that the means comprise a light-emitting diode array whose light-emitting diodes are actuable independently of one another with regard to their brightness, in order that the light cone generated overall is directed, narrowed or expanded by means of the actuation of the light-emitting diode array. More light-emitting diodes are activated for expansion, for example, which light-emitting diodes are deactivated again for narrowing. For directing the light cone, it is possible to activate different light-emitting diodes, which are oriented in particular in different directions.

Preferably, it is furthermore provided that the light-emitting diode array is embodied in a manner surrounding the tool in particular coaxially. What is achieved by the light-emitting diodes of the light-emitting diode array being arranged in a manner surrounding the tool is that the workpiece is covered uniformly by the light cone, without the tool itself casting a shadow on the workpiece. Furthermore, what is achieved by the in particular coaxial arrangement of the light-emitting diodes of the light-emitting diode array is that expansion or narrowing of the light cone can be related directly to the tool.

In accordance with one advantageous development of the disclosure, it is provided that the means comprise at least one in particular displaceable lens whose transparency is variable for influencing the light cone. In particular, by varying the transparency, it is possible to influence the intensity of the light cone or of the generated light. In this regard, it is provided, for example, that with decreasing movements of the handheld power tool, the light intensity is intensified, in particular by the transparency of the lens being increased. Correspondingly, upon greater movements being detected, the transparency of the lens is reduced in order to reduce the light intensity.

In accordance with one advantageous development of the disclosure, it is additionally provided that the means comprise at least one reflector that is displaceable for influencing the light cone. Preferably, the reflector is rotatably or pivotably mounted in order to direct the generated light cone. It is also conceivable to make the reflector translationally displaceable, in order to expand or narrow a light cone. In this case, it is provided, in particular, that the reflector and the abovementioned lens together generate the light cone of the illumination device.

The method according to the disclosure leads to the advantages already mentioned above. It is distinguished by the fact that the handheld power tool is monitored for movements by means of an acceleration sensor, and that the light generated by the illumination device is varied depending on the detected movements of the.

In particular, it is provided that a light cone of the acceleration device is varied depending on the detected movements. Preferably, the light cone is expanded if no or only small accelerations are detected. In particular, the light cone is narrowed in such a way that the generated light is focused onto the tool tip or onto the workpiece situated in front of the tool tip. Further advantages and features are evident from the description already given above and from the claims.

BRIEF DESCRIPTION OF THE DRAWINGS

The disclosure will be explained in greater detail below with reference to a drawing. In this respect.

DETAILED DESCRIPTION

Figure 1:
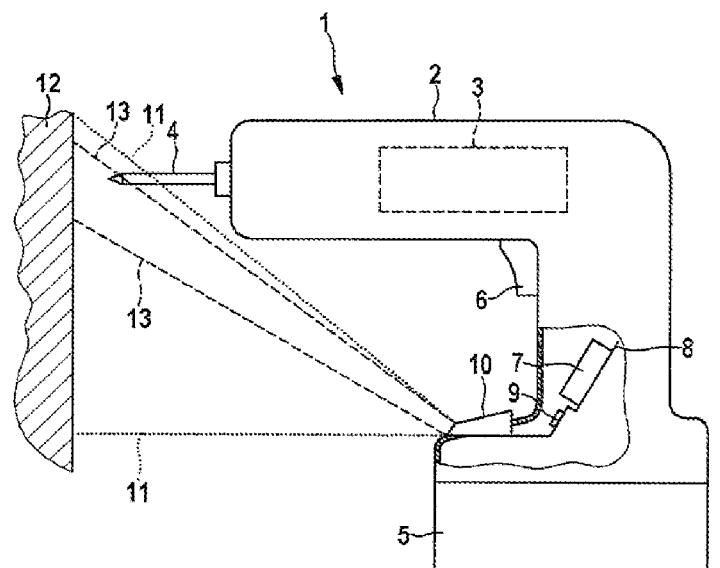
FIG. 1 shows a first exemplary embodiment of a handheld power tool in a simplified side view.

FIG. 1 shows a handheld power tool 1 in a simplified side view, said handheld power tool being embodied as an electric drill. In this regard, the handheld power tool 1 comprises a pistol-shaped housing 2, in which is arranged a drive device 3 for driving a tool 4, which is embodied as a drill bit in the present case. The drive device 3 is embodied as an electric motor which is supplied with electrical energy from an exchangeable energy store 5.

An actuation switch 6 is additionally provided on the housing 2, said switch being adjustable in a continuously variable manner, such that a user can predefine the rotational speed and/or the torque of the drive device 3 for driving the drill bit 4 by actuating the actuation switch 6. In this case, the actuation position of the actuation switch 6 is detected by a control unit 7 and converted into the corresponding signals for driving the drive device 3. The control unit 7 is arranged on a printed circuit board 8, on which an acceleration sensor 9 and an illumination device 10 are additionally arranged. In this case, the illumination device 10 is arranged at the foot of a handle section of the pistol-shaped housing 2 near the energy store 5.

The control unit 7 monitors the measurement values detected by the acceleration sensor 9 and actuates the illumination device 10 depending on detected movements or accelerations of the handheld power tool 1.

In this case, it is provided that if the acceleration sensor 9 detects movements of the handheld power tool 1, the control unit 7 actuates the illumination device 10 in such a way that the illumination device 10 sets an expanded light cone, as shown by dotted boundary lines 11, such that a workpiece 12 to be processed is illuminated over a large area. If the measurement values of the acceleration sensor 9 fall below a predefinable lower limit value, then the control unit 7 actuates the illumination device 10 in such a way that the light cone is narrowed, as indicated by dashed boundary lines 13. In this case, the light cone of the illumination device 10 is focused onto the processing location of the workpiece 12 or onto the tip of the tool 4.

This has the effect that if the user moves the handheld power tool 1, the workpiece 12 is illuminated over a large area, and that as soon as the user holds the handheld power tool 1 more steadily, for example shortly before carrying out a drilling operation, the light cone of the illumination device 10 is focused onto the processing location or the tool tip 4. As a result, the user intuitively perceives whether said user is holding the handheld power tool 1 steadily enough for carrying out a drilling operation.

Figure 2:
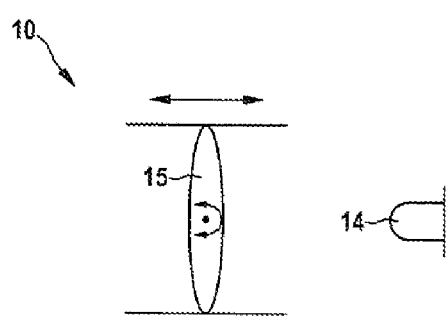
FIG. 2 shows a simplified detail illustration of an illumination device of the handheld power tool.

FIG. 2 shows a first exemplary embodiment of the illumination device 10 in a simplified detail illustration. The illumination device 10 comprises at least one light source, which is embodied as a light-emitting diode 14 in the present case. The light emitted by the light-emitting diode 14 impinges on a lens 15, which is arranged in a manner displaceable translationally relative to the luminous source, as indicated by a double-headed arrow. The lens 15 is optionally also mounted pivotably about an axis, in particular about its axis of symmetry, as indicated by a curved double-headed arrow. By displacing and rotating the lens 15, it is possible to influence and in particular direct the light generated by the light source or by the light-emitting diode 14. In this case, the light cone leaving the lens 15 can for example be directed by the pivoting of the lens 15 and be expanded or narrowed by the movement of the lens. Preferably, the transparency of the lens 15 is additionally variable in order to influence the luminous intensity of the light cone depending on the detected movements.

Figure 3:
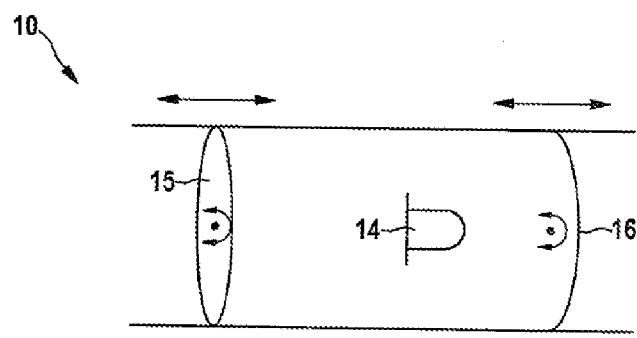
FIG. 3 shows an alternative exemplary embodiment of the illumination device in a simplified detail illustration.

FIG. 3 shows an alternative exemplary embodiment of the illumination device 10, in which the exemplary embodiment known from FIG. 2 was supplemented by a reflector 16. The reflector 16 is likewise displaceable translationally with respect to the light-emitting diode 14 and optionally pivotable about an axis, as indicated by double-headed arrows. In this case, the orientation of the light-emitting diode 14 was changed by 180°, such that it irradiates the reflector 16, which concentrates the emitted light and directs it onto the lens 15 behind the light-emitting diode 14.

Figure 4:
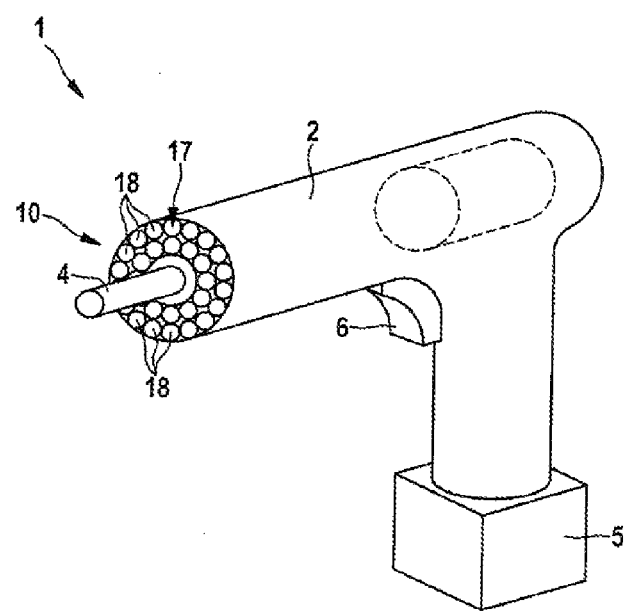
FIG. 4 shows a further exemplary embodiment of the handheld power tool in a perspective illustration.

FIG. 4 shows a further exemplary embodiment of the handheld power tool 1, which exhibits one advantageous configuration of the illumination device 10. In contrast to the previous exemplary embodiments, the illumination device 10 in this case is formed by a light-emitting diode array 17 formed by a multiplicity of light-emitting diodes 18, only some of which are provided with reference signs in the present case. The light-emitting diodes 18 are actuable independently of one another and adjustable in particular in terms of their light intensity. In the present case, the light-emitting diode array 17 is arranged coaxially with respect to the tool 4 of the handheld power tool 1, wherein the light-emitting diode array 17 for this purpose extends in a ring-shaped fashion over the front side of the handheld power tool 1. In this case, the light-emitting diodes 18 are preferably arranged in a ring-shaped fashion in rows, wherein some of the light-emitting diodes 18 are preferably arranged in a manner facing in different directions. The control unit 7 actuates the light-emitting diodes 18 individually depending on the measurement values of the acceleration sensor 9 in order to expand or narrow the light cone generated by the illumination device 10 or by the light-emitting diode array 17, depending on whether the handheld power tool 1 is being moved or held steady. In particular, it is provided that a first group of light-emitting diodes of the light-emitting diode array 17 is actuated, which light-emitting diodes form a narrowed light cone 13, if the handheld power tool 1 is held steady, and additionally a second group of light-emitting diodes 18 is switched on or activated if movements of the handheld power tool 1 are detected, which in particular exceed a predefinable limit value.

The movements of the handheld power tool 1 are thus detected continuously during operation. As soon as the detected accelerations or measurement values of the acceleration sensor 9 exceed the predefinable limit value, the illumination device 10 is actuated in such a way that the light cone is expanded. If the measurement values fall below the lower limit value, then the light cone is narrowed in order to be concentrated or focused onto the processing location. As a result of the advantageous coaxial formation of the light-emitting diode array 17 in accordance with the exemplary embodiment in FIG. 4, what is furthermore achieved is that the tool 4 itself does not cast a shadow on the workpiece, which simplifies processing.

In accordance with a first variant, the light-emitting diodes 17 are individually activated or deactivated depending on the measurement values of the acceleration sensor 9 in order to expand or narrow the light cone of the illumination device 10. Alternatively, however, it is also conceivable to vary the light intensity of the light-emitting diodes in a stepwise manner, such that for example the narrowed light cone has a higher light intensity than the expanded light cone. In this regard, it can be provided that if the measurement values fall below the limit value, the light-emitting diodes 18 which serve for the large-area lighting or illuminating of the workpiece 12 by means of the expanded light cone are reduced in terms of their light intensity, such that the expanded light cone remains in principle, but appears with lower luminosity.

The light-emitting diodes 18 are expediently arranged in such a way that together they can generate a sufficiently large light cone with at least substantially uniform lighting.

What is claimed is:

1. A handheld power tool, comprising:
an actuable drive device configured to drive a tool; and
an illumination device connected to an acceleration sensor, the illumination device being configured to vary its generated light depending on movements of the handheld power tool that are detected by the acceleration sensor,
wherein the illumination device includes a mechanism configured to vary a light cone.

2. The handheld power tool according to claim 1, wherein the illumination device includes a mechanism configured to direct the light cone.

3. The handheld power tool according to claim 1, wherein the illumination device includes a mechanism configured to one or more of expand and narrow the light cone.

4. The handheld power tool according to claim 1, wherein the mechanism includes a light-emitting diode array with a multiplicity of light-emitting diodes that are actuable independently of one another in order to direct, narrow, or expand a common generated light cone.

5. The handheld power tool according to claim 4, wherein the light-emitting diode array is configured in a manner surrounding the tool.

6. The handheld power tool according to claim 1, wherein the mechanism includes at least one displaceable lens having a variable transparency configured to influence the light cone.

7. The handheld power tool according to claim 1, wherein the mechanism includes at least one reflector that is displaceable for influencing the light cone.

8. A method for operating a handheld power tool including an actuable drive device configured to drive a tool and an illumination device, comprising:
monitoring the handheld power tool for movements with an acceleration sensor; and
varying the light generated by the illumination device depending on the detected movements,
wherein a light cone of the illumination device is varied depending on the detected movements.

9. The handheld power tool according to claim 1, wherein the handheld power tool is configured as an electric handheld power tool.

10. The handheld power tool according to claim 5, wherein the light-emitting diode array is configured in a manner surrounding the tool coaxially.

11. The method according to claim 10, wherein the light cone is directed, expanded, or narrowed depending on the detected movements.

* * * * *

UNITED STATES PATENT AND TRADEMARK OFFICE
CERTIFICATE OF CORRECTION

PATENT NO. : 9,573,257 B2  
APPLICATION NO. : 14/677504  
DATED : February 21, 2017  
INVENTOR(S) : Kynast et al.

Page 1 of 1

It is certified that error appears in the above-identified patent and that said Letters Patent is hereby corrected as shown below:

In the Claims

In Column 6, Lines 37-39, Lines 1-3 of Claim 11 should read:

11. The method according to claim 8, wherein the light cone is directed, expanded, or narrowed depending on the detected movements.

Signed and Sealed this
Sixteenth Day of May, 2017

Michelle K. Lee
*Director of the United States Patent and Trademark Office*